(12) United States Patent
Xu (10) Patent No.: US 12,494,675 B1
(45) Date of Patent: Dec. 9, 2025

(54) FIVE-IN-ONE WIRELESS CHARGER

(71) Applicant: Jianwei Xu, Guangdong (CN)

(72) Inventor: Jianwei Xu, Guangdong (CN)

( * ) Notice: Subject to any disclaimer, the term of this patent is extended or adjusted under 35 U.S.C. 154(b) by 0 days.

(21) Appl. No.: 19/312,376

(22) Filed: Aug. 28, 2025

(30) Foreign Application Priority Data

Aug. 1, 2025 (CN) .......................... 202530454714.9
Aug. 13, 2025 (CN) .......................... 202521720396.7

(51) Int. Cl.
*H02J 7/00* (2006.01)
*H02J 50/00* (2016.01)
*H02J 50/10* (2016.01)
*H05K 7/20* (2006.01)

(52) U.S. Cl.
CPC ............ *H02J 50/10* (2016.02); *H02J 7/0013* (2013.01); *H02J 7/0044* (2013.01); *H02J 50/005* (2020.01); *H05K 7/2089* (2013.01)

(58) Field of Classification Search
None
See application file for complete search history.

(56) References Cited

U.S. PATENT DOCUMENTS

| | | | | |
|---|---|---|---|---|
| 6,204,632 B1 * | 3/2001 | Nierescher | ............ | H02J 7/0013 320/113 |
| 6,840,791 B2 * | 1/2005 | Hsiu | .................... | H01R 13/506 439/31 |
| 10,491,727 B1 * | 11/2019 | Liu | ........................ | H04M 1/04 |
| 11,509,160 B2 * | 11/2022 | Pan | .......................... | H02J 7/02 |
| 12,088,112 B1 * | 9/2024 | Yi | .......................... | H02J 50/402 |
| 12,095,296 B1 * | 9/2024 | Balutkar | ............... | H02J 7/0044 |
| 12,308,680 B1 * | 5/2025 | Jeon | ........................ | H02J 50/10 |
| 2004/0204056 A1 * | 10/2004 | Phelps, III | ............ | H02J 7/0044 455/556.1 |
| 2014/0266026 A1 * | 9/2014 | Dowd | ..................... | H02J 7/342 320/108 |
| 2014/0285150 A1 * | 9/2014 | Toh | ....................... | H02J 7/0044 320/115 |
| 2016/0088132 A1 * | 3/2016 | Kranz | ................. | H04M 1/0256 455/556.1 |
| 2017/0187212 A1 * | 6/2017 | Hemesath | ............... | H02J 7/342 |
| 2017/0201108 A1 * | 7/2017 | You | .......................... | H02J 50/12 |
| 2018/0186247 A1 * | 7/2018 | Sychov | ................. | B60L 53/665 |
| 2019/0044563 A1 * | 2/2019 | Thiel | ..................... | H04M 1/185 |
| 2019/0214839 A1 * | 7/2019 | Goldner | .................... | H02J 7/04 |
| 2019/0288469 A1 * | 9/2019 | Messinger | ............ | H01R 24/28 |
| 2020/0054158 A1 * | 2/2020 | Oh | ........................ | H02J 7/0044 |

(Continued)

*Primary Examiner* — Arun C Williams
(74) *Attorney, Agent, or Firm* — Nicholas Makridakis (57) ABSTRACT

A five-in-one wireless charger is provided, including a base. The base is provided with a storage groove, the storage groove is provided with a first charging module, a second charging module is arranged on a back of the first charging module, and the second charging module is configured to extend out of the storage groove when the back of the first charging module is abutted against a bottom surface of the storage groove. The base is provided with a third charging module and a charging end of the third charging module is configured to fit with a surface of the base to form a connecting seat. The base is provided with a fourth charging module and a charging end of the fourth charging module is configured to cooperate with the surface of the base to form a concavely charging groove. The base is internally provided with a connecting component.

10 Claims, 6 Drawing Sheets

(56) References Cited

U.S. PATENT DOCUMENTS

| | | | |
|---|---|---|---|
| 2020/0185952 A1* | 6/2020 | Morrow | H02J 50/005 |
| 2021/0013732 A1* | 1/2021 | Kim | H02J 7/0044 |
| 2022/0069597 A1* | 3/2022 | Hwang | H02J 50/10 |
| 2022/0069600 A1* | 3/2022 | Patel | H02J 7/0045 |
| 2023/0069686 A1* | 3/2023 | Liao | H02J 7/0044 |
| 2024/0029697 A1* | 1/2024 | Yu | G10K 9/10 |
| 2024/0112557 A1* | 4/2024 | Pollard, Jr. | H02J 7/0042 |
| 2024/0178682 A1* | 5/2024 | Wu | H02J 50/90 |
| 2024/0213788 A1* | 6/2024 | Liu | H02J 7/0044 |
| 2024/0421619 A1* | 12/2024 | Li | H02J 7/0044 |
| 2025/0323527 A1* | 10/2025 | Hudson | H02J 50/10 |

* cited by examiner

FIVE-IN-ONE WIRELESS CHARGER

TECHNICAL FIELD

The present disclosure relates to the technical field of chargers, and in particular to a five-in-one wireless charger.

BACKGROUND

With the rapid development of electronic devices such as smart phones, wireless chargers, as an auxiliary charging device, have been widely used in people's lives and offices. Due to the increasing frequency of using electronic products, the power consumption rate of these devices is extremely fast, requiring frequent charging.

In existing technologies, dedicated chargers are usually used for charging. However, due to the wide variety of electronic products, including daily used electronic devices such as smart glasses, smart phones, smart watches, smart rings, and smart earphone cases, the traditional charging modes for these often relies on a separate charger, which not only easily causes desktop cable entanglement and mixed interfaces, but also occupies a lot of space.

SUMMARY

The present disclosure aims to provide a five-in-one wireless charger that can charge daily electronic devices such as smart glasses, smart phones, smart watches, smart rings, and smart earphone cases through charging modules located at different positions, which not only effectively avoids the problems of tangled desktop cables and mixed interfaces, but also saves desktop space.

To achieve above objectives, the present disclosure adopts the following technical solutions.

In some embodiments of the present disclosure, a five-in-one wireless charger is provided, including a base. Herein the base is provided with a storage groove, the storage groove is provided with a first charging module, a second charging module is arranged on a back of the first charging module, and the second charging module is configured to extend out of the storage groove when the back of the first charging module is abutted against a bottom surface of the storage groove. The base is provided with a third charging module, and a charging end of the third charging module is configured to fit with a surface of the base to form a connecting seat. The base is provided with a fourth charging module, and a charging end of the fourth charging module is configured to cooperate with the surface of the base to form a concavely charging groove. Moreover, the base is internally provided with a connecting component, and a connecting end of the connecting component is configured to automatically adsorb and cooperate with a charging device when the charging device comes into contact with an inner wall of the concavely charging groove.

As some preferred embodiments of the present disclosure, the first charging module includes a supportable charging plate that is configured to be rotatably connected to the storage groove through a damping shaft.

As some preferred embodiments of the present disclosure, the base is provided with a buffer pad, and the supportable charging plate is configured to be matched with the buffer pad.

As some preferred embodiments of the present disclosure, the second charging module includes a hangable charging dock that is configured to be fixedly connected to a back of the supportable charging plate.

As some preferred embodiments of the present disclosure, the third charging module includes a cylindrical charging dock that is configured to be fixedly connected to the surface of the base for connecting a smart ring.

As some preferred embodiments of the present disclosure, a wireless charging coil is arranged below the concavely charging groove.

As some preferred embodiments of the present disclosure, the connecting component includes a magnetic ball, the base is internally fixedly connected with a connecting cylinder that is configured to run through upper and lower parts thereon, a lower exit of the connecting cylinder is provided with a buffer element, an upper entrance of the connecting cylinder is provided in a middle of the wireless charging coil, and the magnetic ball is disposed within the connecting cylinder.

As some preferred embodiments of the present disclosure, the buffer element is made of rubber or silicone.

As some preferred embodiments of the present disclosure, heat dissipation holes are disposed on a back of the supportable charging plate.

As some preferred embodiments of the present disclosure, the base is internally provided with a control panel, the control panel is electrically connected to charging modules, and an outer wall of the base is provided with a charging interface that is matched with the control panel.

Compared with the existing technologies, the five-in-one wireless charger of the present disclosure has the following beneficial effects.

1. The five-in-one wireless charger of the present disclosure, by setting the charging modules at different positions, it can be used to charge daily electronic devices such as smart glasses, smart phones, smart watches, smart rings, and smart earphone cases, which not only effectively avoids the problems of tangled desktop cables and mixed interfaces, but also saves desktop space.

2. The parts not involved in this device are the same as or can be implemented by using the existing technologies. The five-in-one wireless charger of the present disclosure can charge daily electronic devices such as smart glasses, smart phones, smart watches, smart rings, and smart earphone cases through charging modules located at different positions. This not only effectively avoids the problems of tangled desktop cables and mixed interfaces, but also saves desktop space.

BRIEF DESCRIPTION OF THE DRAWINGS

To provide a clearer explanation of the specific implementation mode or the technical solutions of the present disclosure and the existing technologies, a brief description will be given to the accompanying drawings required for describing the specific implementation or the existing technologies. Note in all figures, each component or part may not be drawn to actual scale.

In the drawings, reference numerals are as follows. 100. Base, 101. Charging interface, 200. Storage groove, 300. First charging module, 301. Supportable charging plate, 302. Damping shaft, 400. Buffer pad, 500. Heat dissipation hole, 600. Second charging module, 601. Hangable charging dock, 700. Third charging module, 701. Cylindrical charging dock, 800. Fourth charging module, 801. Concavely charging groove, 900. Connecting component, 901. Connecting cylinder, 902. Buffer element, 903. Magnetic ball.

DETAILED DESCRIPTION OF THE EMBODIMENTS

The following will provide a clear and complete description of the technical solutions in the embodiments of the present disclosure in conjunction with the accompanying drawings. Obviously, the described embodiments are only a part of the embodiments of the present disclosure, not all of them. Based on the embodiments of the present disclosure, all other embodiments obtained by one of ordinary skill in the art without creative labor shall fall within the scope of protection of the present invention.

With the rapid development of electronic devices such as smart phones, wireless chargers, as an auxiliary charging device, have been widely used in people's lives and offices. Due to the increasing frequency of using electronic products, the power consumption rate of these devices is extremely fast, requiring frequent charging. In daily life, dedicated chargers are usually used for charging. However, due to the wide variety of electronic products, including daily used electronic devices such as smart glasses, smart phones, smart watches, smart rings, and smart earphone cases, the traditional charging method for these often relies on a separate charger, which not only easily causes desktop cable entanglement and mixed interfaces, but also occupies a lot of space.

EMBODIMENTS

Referring to FIG. 1 to FIG. 6, in some embodiments of the present disclosure, a five-in-one wireless charger is provided, including a base 100. Herein the base 100 is provided with a storage groove 200, the storage groove 200 is provided with a first charging module 300, a second charging module 600 is arranged on a back of the first charging module 300. The first charging module 300 includes a supportable charging plate 301 that is configured to be rotatably connected to the storage groove 2 through a damping shaft 302, this can make the supportable charging plate 301 rotate freely to form a style of phone holder. The supportable charging plate 301 is provided with multiple charging coils, which can adapt to different types of electronic devices, such as smart phones, to achieve the function of charging the devices. Moreover, the base 100 is provided with a buffer pad 400, which is configured to be matched with the supportable charging plate 300. The surface of the buffer pad 400 is made of wear-resistant and anti-slip materials, this can ensure that the electronic devices placed on thereon be charged stably and not easily slip off.

Figure 1:
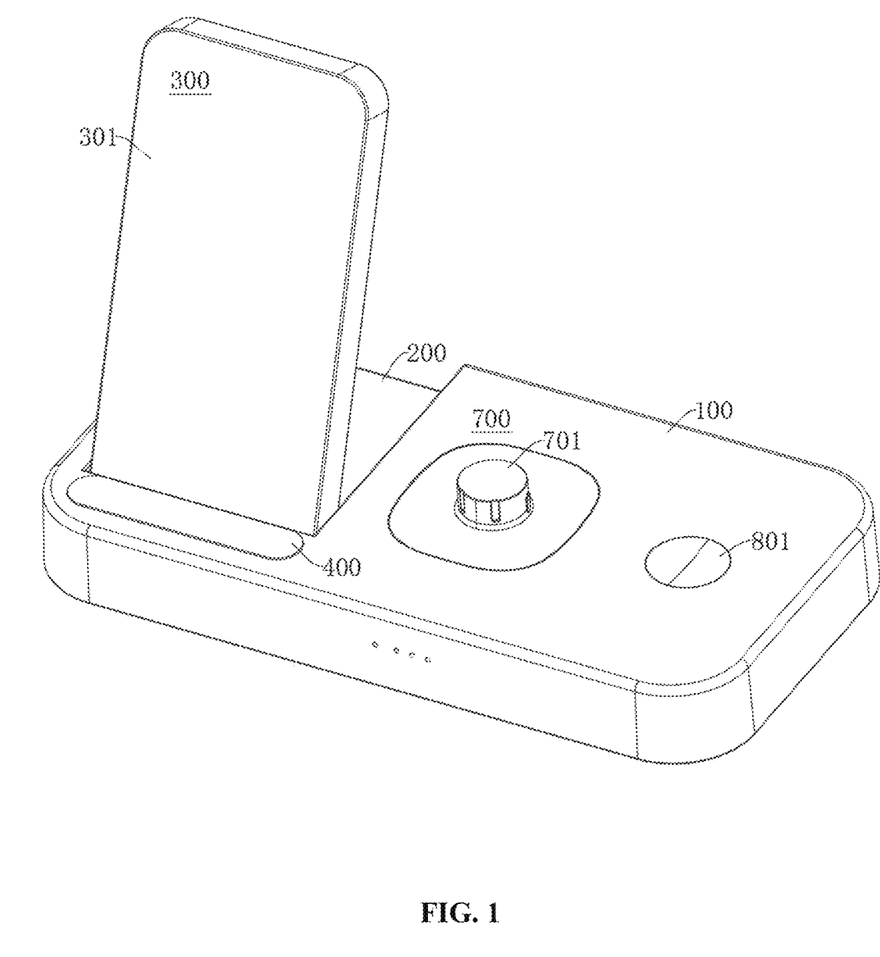
FIG. 1 shows a perspective view of a five-in-one wireless charger in accordance with some embodiments of the present disclosure.
Figure 3:
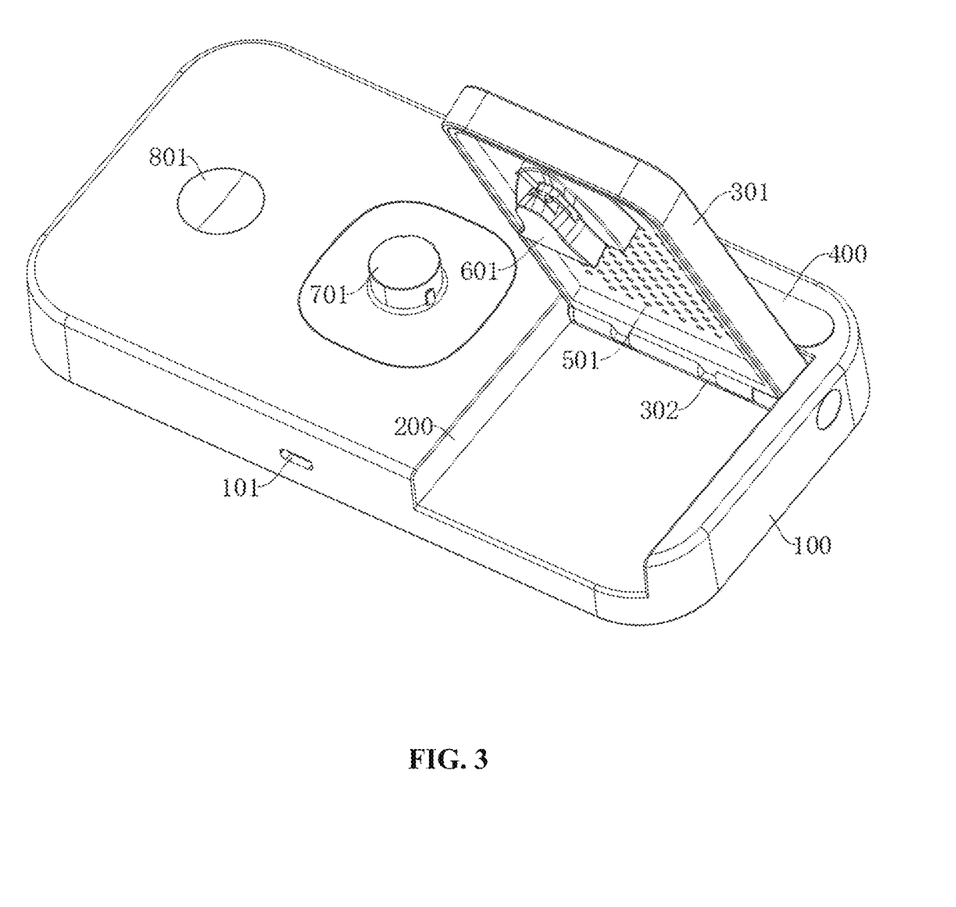
FIG. 3 shows a schematic diagram of a back of the supportable charging plate of the five-in-one wireless charger in accordance with some embodiments of the present disclosure.

The second charging module 600 includes a hangable charging dock 601 that is configured to be fixedly connected to a back of the supportable charging plate 301. The hangable charging dock 601 is provided with a charging block, which can be adapted to smart glasses to meet the diverse charging needs of users.

The hangable charging dock 601 is provided with a positioning pin contact point for contacting the smart glasses charging port for charging.

Meanwhile, the design of the hangable charging dock 601 enables this small electronic device to be suspended for charging, saving space and avoiding the clutter of desktop cables. Moreover, the hangable charging dock 601 is fixed with the back of the supportable charging plate 301 by such stable connection structure to ensure that they will not shake during the charging process, ensuring the stability and safety of charging. Furthermore, the back of the supportable charging plate 301 is provided with heat dissipation holes 500 for heat dissipation treatment.

Figure 2:
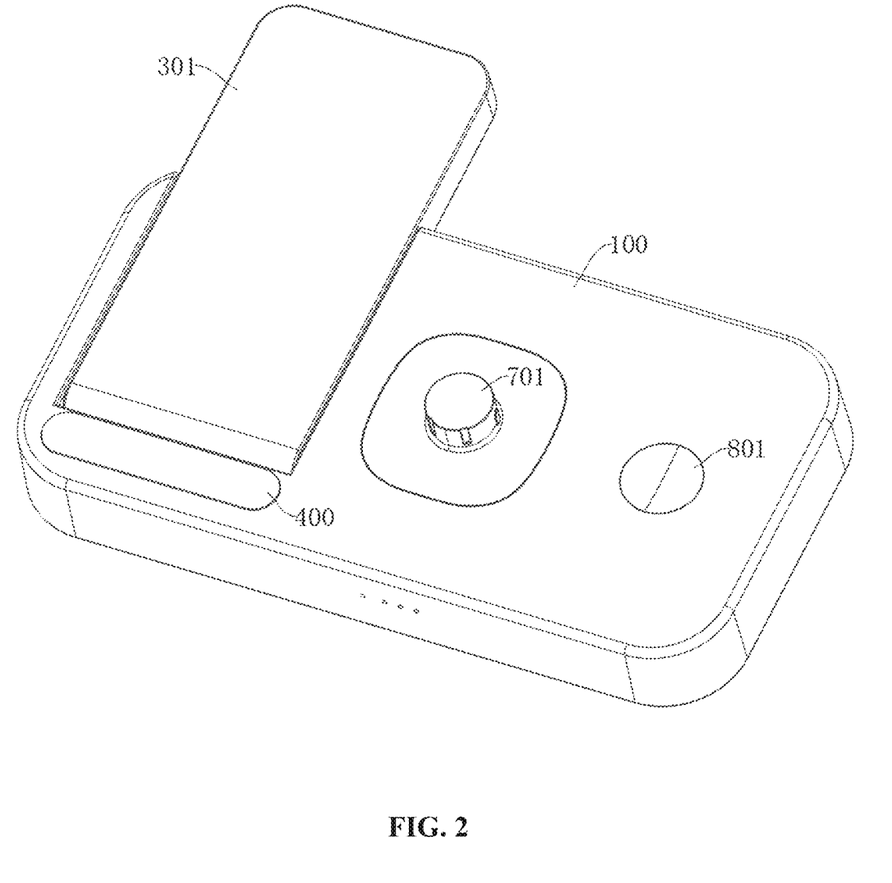
FIG. 2 shows a schematic diagram of the five-in-one wireless charger after a supportable charging plate being stored in accordance with some embodiments of the present disclosure.

When the supportable charging plate 301 is stored, the hangable charging dock 601 will move to the outside of the base 100 to prevent covering the storage groove 200.

The base 100 is further provided with a third charging module 700, and a charging end of the third charging module 700 is configured to fit with the surface of the base 100 to form a connecting seat. The third charging module 700 includes a cylindrical charging dock 701 that is configured to be fixedly connected to the surface of the base 100 for connecting to a smart ring. The cylindrical charging dock 701 is internally provided with an FPC (flexible printed circuit) coil soft board, which can charge the smart ring. At the same time, the FPC coil soft board also has data transmission function, which enables the smart ring to synchronously update or exchange information between devices while charging with the cylindrical charging dock 701, greatly improving the user experience. In addition, the design of the FPC coil soft board makes the charging process more efficient. The smart ring only needs to be placed on the cylindrical charging dock 701 to achieve automatic alignment and fast charging, without need for cumbersome interface operations.

Furthermore, the surface of the cylindrical charging dock 701 is treated with anti slip texture, which can maintain stability and prevent slipping even if the smart ring is lightly touched during the charging process, ensuring the safety of charging process.

Figure 4:
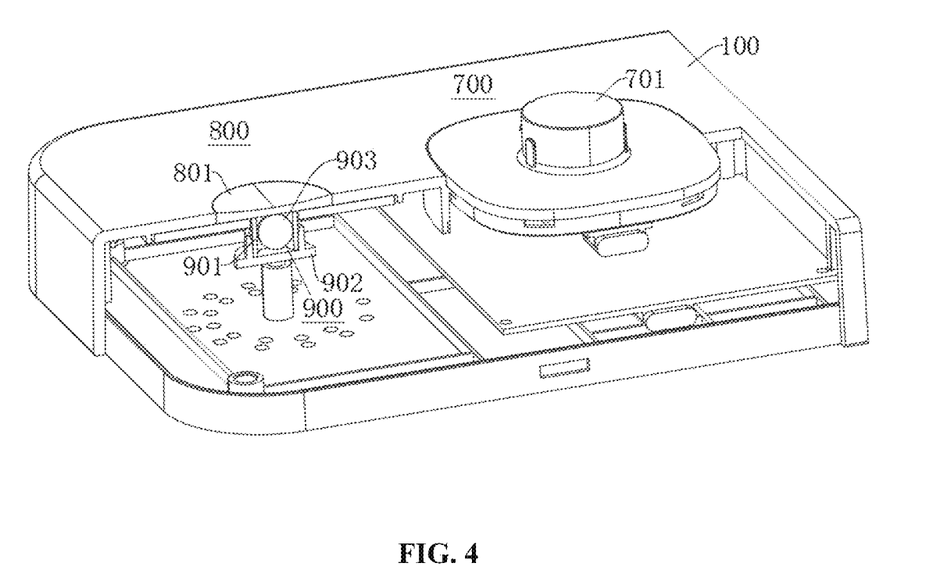
FIG. 4 shows a sectional schematic diagram of the five-in-one wireless charger in accordance with some embodiments of the present disclosure.
Figure 5:
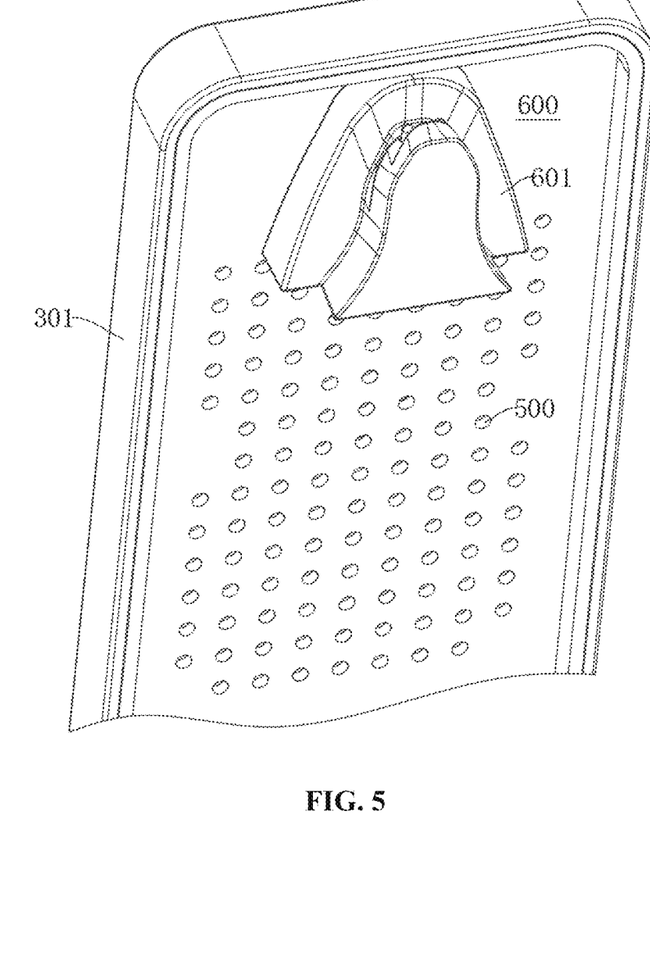
FIG. 5 shows another sectional schematic diagram of the five-in-one wireless charger in accordance with some embodiments of the present disclosure.

The base 100 is further provided with a fourth charging module 800, and a charging end of the fourth charging module 800 is configured to cooperate with the surface of the base 100 to form a concavely charging groove 801. The concavely charging groove 801 can be used to place smart watches and smart earphone cases those have protruding electronic devices at the bottom thereon. The fourth charging module 800 includes a concavely charging groove 8 located on the base 100, and a wireless charging coil is arranged below the concavely charging groove 800. Considering the external characteristics of the smart watches and the smart earphone cases, its shape and size are matched with these devices, allowing them to be stably placed in the charging slot while ensuring that the charging coil is contact with the charging contacts at the bottom of the device, thereby achieving charging. The base 100 is further provided with a connecting component 900 inside, which mainly includes a magnetic ball 903. The base 100 is internally fixedly connected with a connecting cylinder 901 that is configured to run through upper and lower parts thereon, a lower exit of the connecting cylinder 901 is provided with a buffer element 902, an upper entrance of the connecting cylinder 901 is provided in a middle of the wireless charging coil, and the magnetic ball 903 is disposed within the connecting cylinder 901. When the smart watches and the smart earphone cases need to be charged, the magnetic ball 903 will be affected by magnetic force and move to the upper entrance of the connecting cylinder 901 to magnetically connect with the charging electronic device, thereby fixing it in place. That is to say, the metal parts on the smart watches and the smart earphone cases are fixed together with the magnetic suction of the magnetic ball 903. When the electronic device is removed from the concavely charging groove 801, the magnetic ball 903 will fall down automatically. At this time, the buffer element 902 is configured to buffer it to prevent noise, and the buffer element 902 may be made of rubber, silicone, sponge or foam.

Figure 6:
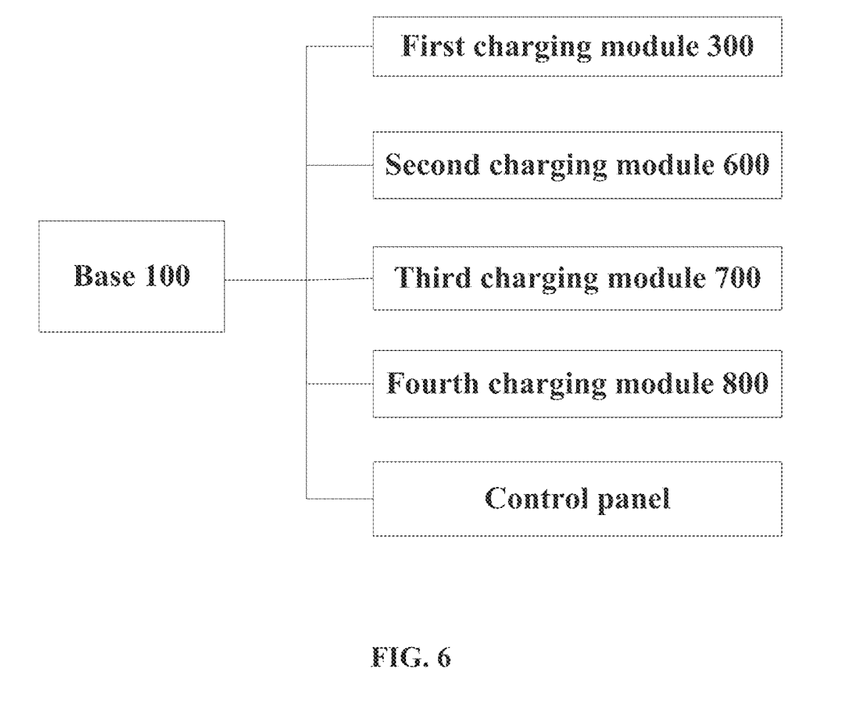
FIG. 6 shows a block diagram of the base of the five-in-one wireless charger in accordance with some embodiments of the present disclosure.

In some embodiments of the present disclosure, the supportable charging plate 301 and the concavely charging groove 801 are both provided with wireless charging coils for charging, the base 100 is internally provided with a control panel, which is electrically connected to all charging modules mentioned above for power supply. Moreover, an outer wall of the base 100 is provided with a charging interface 101 that is configured to be matched with the control panel, the charging interface 101 can be connected to an external power source to provide power to entire control panel. At the same time, the control panel is also responsible for managing and distributing electricity to ensure that each charging module can function properly. During the charging process, users can check the charging status, including charging progress, charging speed, and other information, through indicator lights or display screen on the control panel. In addition, the control panel also has safety functions such as overcharge protection and short circuit protection. Once an abnormal situation is detected, the power will be immediately cut off to ensure the safety of the device and the users. It can then charge daily electric devices such as smart glasses, smart phones, smart watches, smart rings, and smart earphone case. This not only can avoid the problems of desktop cable entanglement and interface mixing, but also can greatly save desktop space.

The working principle is as follows. The base 100 is provided with the storage groove 200, and the first charging module 300 is disposed above the storage groove 200. The back of the first charging module 300 is installed with the second charging module 600, the first charging module 300 includes the supportable charging plate 301 connected to the storage groove 200 through the damping shaft 302, which allows the supportable charging plate 301 to rotate freely, forming the style of the phone holder. The supportable charging plate 301 is provided with multiple charging coils, which can adapt to different types of electronic devices, such as the smart phones, to achieve the function of charging the devices. In addition, the base 100 is further provided with a buffer pad 400, and the supportable charging plate 301 is configured to cooperate with the buffer pad 400. The surface of the buffer pad 400 is made of wear-resistant and anti slip materials, ensuring that the electronic devices placed thereon are stable and reliable during the charging process, and are not easy to slip off.

Furthermore, the design of the buffer pad 400 also takes into account the actual user experience, and its thickness is moderate, providing sufficient cushioning effect without taking up too much space. At the same time, the edge of the buffer pad 400 has been smoothed to avoid discomfort for users when picking up or placing electronic devices due to sharp corners.

At the bottom of the storage groove 200, the heat dissipation holes 500 are cleverly designed thereon. Due to the heat generated during wireless charging, the setting of the heat dissipation holes 500 can effectively dissipate the heat within the base 100, ensuring the stable operation of the charger. In addition, the position and size of the heat dissipation holes 500 have been carefully calculated to ensure optimal heat dissipation without compromising aesthetics.

In conclusion, the five-in-one wireless charger of the present disclosure, through clever designs, not only achieves wireless charging function for various electronic devices, but also fully considers the convenience and safety of users.

The second charging module 600 includes the hangable charging dock 601 fixedly connected to the back of the supportable charging plate 301, the hangable charging dock 601 is provided with the charging block, which is configured to match with the smart glasses to meet the diverse charging needs of users.

Meanwhile, the design of the hangable charging dock 601 enables this small electronic device to be suspended for charging, saving space and avoiding the clutter of desktop cables. In addition, the hangable charging dock 601 and the back of the supporting charging plate 301 are fixed by a stable connection structure that they will not shake during the charging process, ensuring the stability and safety of charging. Moreover, the heat dissipation holes 500 are arranged on the back of the supportable charging plate 301 for heat dissipation treatment.

When the supportable charging plated 301 is stored, the hangable charging dock 601 will move to the outside of the base 1 to prevent covering the storage groove 200.

The base 100 is provided with the third charging module 700, and the charging end of the third charging module 700 is configured to fit with the surface of the base 100 to form the connecting seat. The third charging module 700 includes the cylindrical charging dock 701 fixedly connected to the surface of the base 100 for connecting to the smart ring. The cylindrical charging dock 701 is provided with the FPC coil soft board for charging the smart ring. At the same time, the FPC coil soft board also has data transmission function, which enables the smart ring to synchronously update data or exchange information between devices while charging with the cylindrical charging dock 701, greatly improving the users' experience. In addition, the design of the FPC coil soft board makes the charging process more efficient. The smart ring only needs to be placed on the cylindrical charging dock 701 to achieve automatic alignment and fast charging, without the need for tedious interface operations.

Furthermore, the surface of the cylindrical charging dock 701 is treated with slip texture, which can maintain stability and prevent slipping even if the ring is lightly touched during the charging process, ensuring the safety of the charging process.

The base 100 is further provided with the fourth charging module 800, and the charging end of the fourth charging module 800 is configured to cooperate with the surface of the base 100 to form the concavely charging groove 801, which can be used to place the smart watches and the smart earphone cases those having protruding electronic devices at the bottom thereon. The wireless charging coils are arranged below the concavely charging groove 801. Considering the external characteristics of the smart watches and the smart earphone cases, its shape and size are matched with these devices, allowing them to be stably placed in the charging slot while ensuring that the charging coil is contact with the charging contacts at the bottom of the device, thereby achieving charging. The base 100 is further provided with the connecting component 900 inside, which mainly includes the magnetic ball 903. The base 100 is internally fixedly connected with the connecting cylinder 901 that is configured to run through upper and lower parts thereon, the lower exit of the connecting cylinder 901 is provided with the buffer element 902, the upper entrance of the connecting cylinder 901 is provided in the middle of the wireless charging coil, and the magnetic ball 903 is disposed within the connecting cylinder 901. When the smart watches and the smart earphone cases need to be charged, the magnetic ball 903 will be affected by magnetic force and move to the upper entrance of the connecting cylinder 901 to magnetically connect with the charging electronic device, thereby fixing it in place. That is to say, the metal parts on the smart watches and the smart earphone cases are fixed together with the magnetic suction of the magnetic ball 903. When the electronic device is removed from the concavely charging groove 801, the magnetic ball 903 will fall down automatically. At this time, the buffer element 902 is configured to buffer it to prevent noise, and the buffer element 902 may be made of rubber, silicone, sponge or foam.

The design of the buffer element 902 not only effectively reduces the impact sound of the magnetic ball 903 during movement, but also ensures a quiet and smooth charging process. Moreover, anti slip strips are installed at the edges of the concavely charging groove 801 to increase the stability of the smart watches and the smart earphone cases during storage and also prevent from slipping during charging. The design of the anti slip strips takes into account the actual needs of the users during use, using wear-resistant and elastic materials such as silicone or rubber to ensure good anti slip effect after long-term use. At the same time, the setting of the anti slip strips also considers aesthetics, and their colors are coordinated with the overall color tone of the base 100, making the entire charger look more high-end and atmospheric.

The supportable charging plate 301 and the concavely charging groove 801 are both provided with wireless charging coils for charging devices, the base 100 is internally provided with the control panel, which is electrically connected to all charging modules for power supply. Moreover, the outer wall of the base 100 is provided with the charging interface 101 that is matched with the control panel, the charging interface 101 can be connected to the external power source to provide power to the entire control panel. At the same time, the control panel is also responsible for managing and distributing electricity to ensure that the all charging modules can function properly. During the charging process, the users can check the charging status, including charging progress, charging speed, and other information, through indicator lights or display screen on the control panel. In addition, the control panel also has safety functions such as overcharge protection and short circuit protection. Once an abnormal situation is detected, the power will be immediately cut off to ensure the safety of the device and the users. Such design can charge devices such as smart glasses, smart phones, smart watches, smart rings, and smart earphone cases, effectively avoiding desktop cable entanglement and interface mixing issues, and significantly saving desktop space.

In addition, the five-in-one wireless charger of the present disclosure is exquisitely designed and easy to carry. A placement slot is provided at the bottom of the base 1 (not shown in the figures), which can neatly store excess charging cables, avoiding the problem of messy cables and making the entire charger more tidy and beautiful. At the same time, the base 1 is made of high-quality ABS (Acrylonitrile Butadiene Styrene) plastic, which is not only lightweight and durable, but also has good fire and flame retardant properties, further enhancing the safety of use. The wireless charger of the present disclosure also has intelligent recognition function, which can automatically identify the type of connected device and adjust the charging power according to the device requirements, ensuring charging efficiency and avoiding energy waste. In short, the five-in-one wireless charger of the present disclosure brings great convenience to users with its high efficiency, convenience, and safety features.

Components not detailed herein are existing technologies.

Finally, it should be noted that the above embodiments are only used to illustrate the technical solutions of the present disclosure, and not to limit it. Although the present disclosure has been described in detail with reference to the above embodiments, one of ordinary skill in the art should understand that he/she can sill modify the technical solutions described in the above embodiments, or equivalently replace some of the technical features, and these modifications or substitutions do not depart from the concept and scope of the technical solutions of the above embodiments of the present disclosure.

What is claimed is:

1. A five-in-one wireless charger, comprising a base; wherein the base is provided with a storage groove, the storage groove is provided with a first charging module, a second charging module is arranged on a back of the first charging module, and the second charging module is configured to extend out of the storage groove when the back of the first charging module is abutted against a bottom surface of the storage groove;
wherein the base is provided with a third charging module, and a charging end of the third charging module is configured to fit with a surface of the base to form a connecting seat;
wherein the base is provided with a fourth charging module, and a charging end of the fourth charging module is configured to cooperate with the surface of the base to form a concavely charging groove; and
wherein the base is internally provided with a connecting component, and a connecting end of the connecting component is configured to automatically adsorb and cooperate with a charging device when the charging device comes into contact with an inner wall of the concavely charging groove.

2. The five-in-one wireless charger according to claim 1, wherein the first charging module comprises a supportable charging plate that is configured to be rotatably connected to the storage groove through a damping shaft.

3. The five-in-one wireless charger according to claim 2, wherein the base is provided with a buffer pad, and the supportable charging plate is configured to be matched with the buffer pad.

4. The five-in-one wireless charger according to claim 2, wherein the second charging module comprises a hangable charging dock that is configured to be fixedly connected to a back of the supportable charging plate.

5. The five-in-one wireless charger according to claim 1, wherein the third charging module comprises a cylindrical charging dock that is configured to be fixedly connected to the surface of the base for connecting a smart ring.

6. The five-in-one wireless charger according to claim 1, wherein a wireless charging coil is arranged below the concavely charging groove.

7. The five-in-one wireless charger according to claim 6, wherein the connecting component comprises a magnetic ball, the base is internally fixedly connected with a connecting cylinder that is configured to run through upper and lower parts thereon, a lower exit of the connecting cylinder is provided with a buffer element, an upper entrance of the connecting cylinder is provided in a middle of the wireless charging coil, and the magnetic ball is disposed within the connecting cylinder.

8. The five-in-one wireless charger according to claim 7, wherein the buffer element is made of rubber or silicone.

9. The five-in-one wireless charger according to claim 2, wherein heat dissipation holes are disposed on a back of the supportable charging plate.

10. The five-in-one wireless charger according to claim 1, wherein the base is internally provided with a control panel, the control panel is electrically connected to charging modules, and an outer wall of the base is provided with a charging interface that is matched with the control panel.

* * * * *